(12) United States Patent
DeMarco et al.

(10) Patent No.: US 8,165,765 B2
(45) Date of Patent: Apr. 24, 2012

(54) VARIATOR PRESSURE-SET TORQUE CONTROL

(75) Inventors: Frank A. DeMarco, East Peoria, IL (US); Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 12/790,528

(22) Filed: May 28, 2010

(65) Prior Publication Data

US 2011/0295473 A1    Dec. 1, 2011

(51) Int. Cl.
  *G06F 19/00* (2006.01)
(52) U.S. Cl. ............... 701/58; 701/60; 701/61; 60/427; 60/428; 60/431; 60/434
(58) Field of Classification Search ............ 701/58, 701/60–61; 60/427–428, 431, 434
  See application file for complete search history.

(56) References Cited

U.S. PATENT DOCUMENTS

| | | | |
|---|---|---|---|
| 3,590,577 A | 7/1971 | Utter | |
| 3,727,402 A | 4/1973 | Keith et al. | |
| 3,952,515 A | 4/1976 | Habiger et al. | |
| 3,998,287 A | 12/1976 | Paramythioti | |
| 4,111,073 A * | 9/1978 | Chana | 477/41 |
| 4,122,732 A * | 10/1978 | Chana | 477/69 |
| 4,191,091 A | 3/1980 | Zeuner et al. | |
| 4,203,293 A | 5/1980 | Bubula et al. | |
| 4,459,878 A | 7/1984 | Frank | |
| 4,510,750 A | 4/1985 | Izumi et al. | |
| 4,518,320 A | 5/1985 | Goodell | |
| 4,561,250 A | 12/1985 | Aoyagi et al. | |
| 4,612,827 A | 9/1986 | Omitsu | |
| 4,879,501 A | 11/1989 | Haner | |
| 4,977,760 A | 12/1990 | Ishimori et al. | |
| 5,077,973 A * | 1/1992 | Suzuki et al. | 60/428 |
| 5,295,795 A | 3/1994 | Yasuda et al. | |
| 5,628,188 A | 5/1997 | Kordak | |
| 5,667,452 A | 9/1997 | Coutant | |
| 5,784,883 A * | 7/1998 | Ohkura et al. | 60/327 |
| 6,048,177 A | 4/2000 | Erkkilae et al. | |

(Continued)

FOREIGN PATENT DOCUMENTS

DE    2848595 A1    9/1978

(Continued)

OTHER PUBLICATIONS

Study on braking capacity of hydrostatic transmission vehicle; Heyan Li; Baorui Chen; Biao Ma; Man Chen; Intelligent Vehicles Symposium, 2009 IEEE; Digital Object Identifier: 10.1109/IVS.2009.5164390; Publication Year: 2009 , pp. 848-851.*

(Continued)

*Primary Examiner* — Cuong H Nguyen
(74) *Attorney, Agent, or Firm* — Leydig, Voit & Mayer (57) ABSTRACT

A method and system for configuring a hydromechanical transmission having a hydraulic pump and a hydraulic motor driven by the hydraulic pump and a pressure-driven actuator employs a particular torque-pressure curve configuration to maximize torque resolution with respect to actuator pressure changes while ensuring that the curve is substantially monotonic in each dimension and at any available motor speed within a predetermined motor speed limit and any available actuator pressure within predetermined actuator pressure limits. The resultant four-dimensional association between actuator pressure, motor speed, primary power source speed and motor torque allows selection of an actuator pressure to provide a desired torque.

20 Claims, 5 Drawing Sheets

U.S. PATENT DOCUMENTS

| | | |
|---|---|---|
| 6,424,902 B1 | 7/2002 | Kuras |
| 6,684,636 B2 | 2/2004 | Smith |
| 2003/0205044 A1 | 11/2003 | Franz |

FOREIGN PATENT DOCUMENTS

| | | | |
|---|---|---|---|
| DE | 4308198 C1 | | 7/1994 |
| JP | PCT/JP95/02279 | * | 11/1994 |
| JP | 63-190076 | * | 7/1998 |
| WO | WO90/01587 | * | 2/1990 |
| WO | WO96/15394 | * | 5/1996 |

OTHER PUBLICATIONS

SR drive for hydraulic pump using a novel passive boost converter; Dong-Hee Lee; Seung-Hun Seok; Jin-Woo Ahn; Energy Conversion Congress and Exposition, 2009. ECCE 2009. IEEE; Digital Object Identifier: 10.1109/ECCE.2009.5315988 Publication Year: 2009 , pp. 282-287.*

Development and Control of an Electric Oil Pump for Automatic Transmission-Based Hybrid Electric Vehicle; Yeonho Kim; Jaesang Lee; Chihoon Jo; Yongha Kim; Minseok Song; Jonghyun Kim; Hyunsoo Kim; Vehicular Technology, IEEE Transactions on vol. 60 , Issue: 5;Digital Object Identifier: 10.1109/TVT.2011.2140135; Pub Yr: 2011 , pp. 1981-1990.*

Simulation study on constant speed output control of fixed displacement pump-variable displacement motor hydraulic system Ai Chao Kong; Xiangdong Zhang; Gang Li Hao; Fluid Power and Mechatronics (FPM), 2011 International Conference on Digital Object Identifier: 10.1109/FPM.2011.6045772; Publication Year: 2011 , pp. 276-281.*

Performance of SR drive for hydraulic pump; Kim, B.C.; Lee, D.H.; Ahm, J.W.; Electrical Machines and Systems, 2005. ICEMS 2005. Proceedings of the Eighth International Conference on; vol. 1; Digital Object Identifier: 10.1109/ICEMS.2005.202613 Publication Year: 2005 , pp. 659-663 vol. 1.*

Coupling Influence Analysis on the Secondary Regulation Servo Loading System of Axial Plunger Pump/Motor Hui Wang; Shucheng Duan; E-Product E-Service and E-Entertainment (ICEEE), 2010 International Conference on Digital Object Identifier: 10.1109/ICEEE.2010.5661239; Publication Year: 2010 , pp. 1-3.*

* cited by examiner

VARIATOR PRESSURE-SET TORQUE CONTROL

TECHNICAL FIELD

This patent disclosure relates generally to transmission control, and more particularly to configuring a transmission having a hydraulic motor or variator to enable accurate torque control.

BACKGROUND

For machines that are not directly driven by their respective power sources, a transmission is a critical component of the drive train, affecting both performance and efficiency. Transmissions fulfill many roles, including, for example, gear reduction or amplification to match final drive speed and/or torque to engine speed and/or torque, connection and disconnection between the power source and the final drive, drive train shock absorption, machine energy absorption, i.e., during machine slowing, and so on. While the fulfillment of many of these goals requires a certain amount of complexity within the transmission system, this same complexity can lead to problems in transmission controllability and stability.

Hydraulic transmissions and drives can be used to great benefit in many scenarios, but are fairly complex. Such transmissions include without limitation hystat, hydromechanical, or other transmissions or drives that include a hydraulic variator or hydraulic pump/motor system. One of the more useful but complex hydraulic transmission systems is the hydromechanical split torque (or parallel path) transmission, which will be discussed by way of example herein. This transmission type provides numerous advantages over typical mechanical transmissions used in earth-working machines, such as tractors, bulldozers, and wheel loaders. For example, a hydromechanical transmission is typically able to provide continuous speed control and more effective and efficient management of engine speed.

Due to the complexity of such transmissions however, their mode of control is quite different from the techniques by which standard mechanical transmissions are controlled. As will be discussed in detail below, a hydromechanical split torque transmission includes a variator whose output is tied to the primary power source, usually an engine, via a set of planetary gear systems within the transmission. The variator includes a hydrostatic pump that has a displacement that is influenced by an actuator.

The transmission output is thus a function of the instantaneous characteristics of both the engine and the variator. Traditionally, such hydromechanical transmissions are controlled by speed control techniques. In particular, the transmission output speed is controlled by controlling pump displacement. This practice uses feedback control on the pump actuator to force the actuator to a specific position, thus enforcing a specific pump displacement. While such speed control systems provide torque at the output, they do not control the output torque, just the output speed or speed ratio (an output speed over an input speed). This system has been effective in certain industries; however, the lack of torque control is disadvantageous in a number of industries and environments, especially those involving the use of large earth-working machines.

For example, when a speed-controlled machine encounters a sudden resistance due to load or grade, the speed-controlled transmission may cause the engine to lug as it maintains speed ratio or speed, or may cause other instabilities or undesirable behavior with respect to the drive train. One type of system for controlling speed is discussed in U.S. Pat. No. 6,684,636 to Smith. Smith teaches a method for controlling speed using an electrical signal applied to a solenoid to change the pump's displacement. On generally level surfaces, this method has been successful, however, as discussed above, on uneven surfaces, an operator, or machine experiences undesirable accelerations as the controls hunt for the desired speed.

Thus, while speed-controlled transmissions could in theory be expected to meet the needs of earth-working industries, the system has not been widely successful in practical application, due to the difficulty in determining correct pump displacement under rapidly changing surface conditions. In particular, any error in the displacement during speed control can cause lugs and lurches and generally undesirable machine behavior.

The disclosed principles herein are directed at least in part to overcoming one or more disadvantages of the prior art, noted or otherwise. However, it will be appreciated that the invention itself is defined by the attached claims without regard to whether and to what extent the specifically claimed invention overcomes one or more of the noted problems in the existing technology. Moreover, it will be appreciated that any discussion herein of any reference or publication is merely intended as an invitation to study the indicated reference itself, and is not intended to replace or supplement the actual reference. To the extent that the discussion of any reference herein is inconsistent with that reference, it will be appreciated that the reference itself is conclusive as to its teachings.

SUMMARY

In one aspect, an apparatus for controlling a desired torque output from a hydromechanical or other hydraulic drive or transmission is provided. The apparatus comprises a control module configured to determine the desired torque and to determine an actuator pressure that, when applied will cause a variator (or other hydraulic motor) to output the desired torque.

In another aspect, an exemplary transmission for outputting a desired torque is provided. The transmission comprises a variable displacement pump drivingly connected to a suitable output-producing device such as an internal combustion engine, a fixed or variable displacement hydraulic motor drivingly connected to the variable displacement pump, a gear system, an actuator, and a control module. The actuator is configured to influence displacement of the variable displacement pump and the control module is configured to determine the desired torque and to determine an actuator pressure that, when applied will cause a variator to output the desired torque.

In another aspect, a method for controlling a desired torque output from a transmission or drive system is provided. The method includes the steps of determining the desired torque and outputting the desired torque from a motor, e.g., within a hydromechanical transmission.

It is to be understood that both the foregoing general description and the following detailed description are exemplary and explanatory only and are not restrictive of the invention.

Further aspects and features of the disclosed principles will be appreciated from the following detailed description and the accompanying drawings, of which:

DETAILED DESCRIPTION

This disclosure relates to transmission and drive control, and more particularly to providing a desired torque output from a hydraulic motor, e.g., within a hystat or hydromechanical transmission, by determining and applying a specific actuator pressure. Thus, while this disclosure focuses on a hydromechanical system by way of example, it will be appreciated by those of skill in the art that the described principles are applicable to any system employing a hydraulic motor driven by an actuator-controlled variable displacement hydraulic pump.

Figure 1:
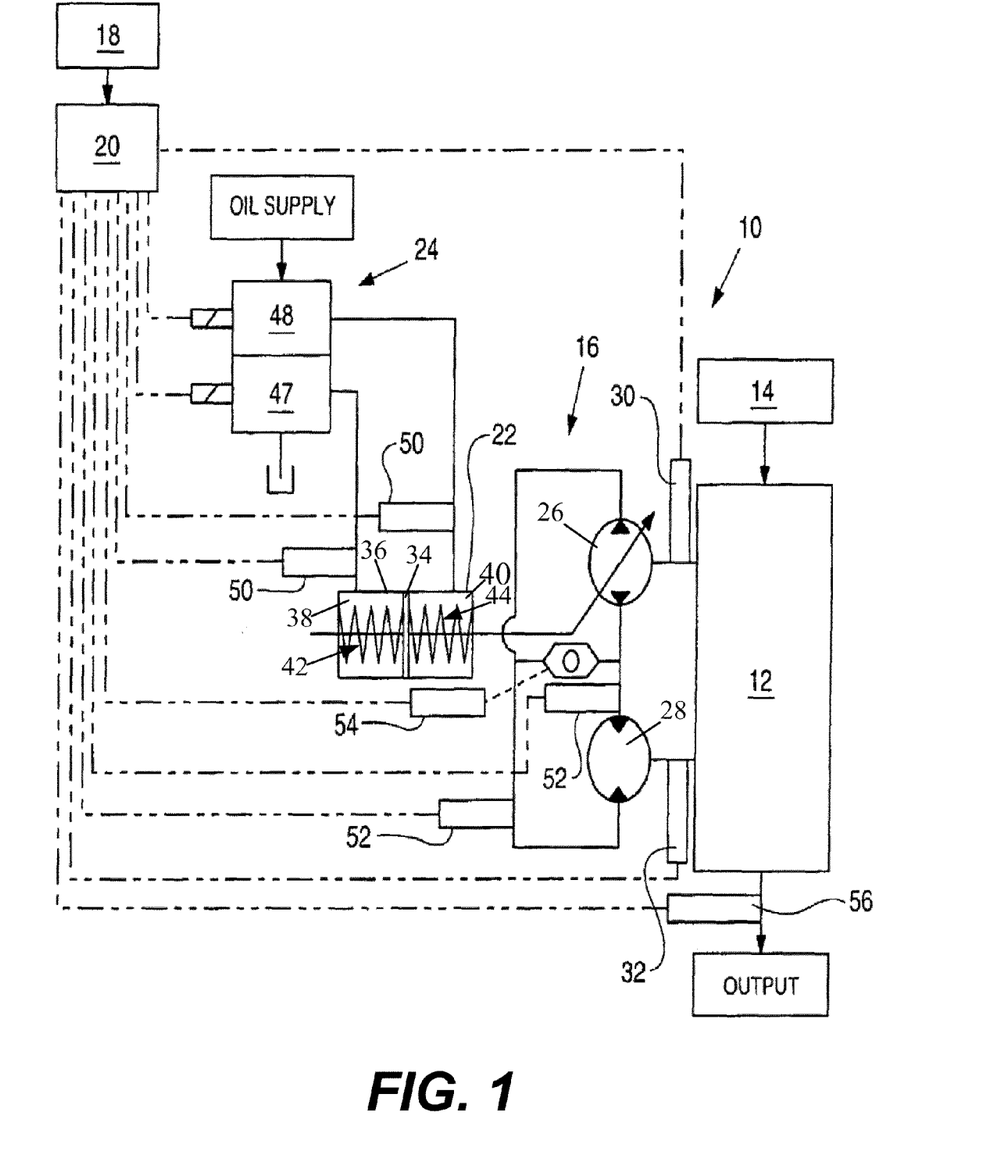
FIG. 1 is a schematic diagram of a hydromechanical transmission system within which the described principles may be beneficially applied.

In overview, FIG. 1 shows a schematic of a hydromechanical transmission, including the portions of significance for a full understanding of the described principles. The illustrated hydromechanical transmission 10 comprises a gear system 12, a hydrostatic unit 16, an input module 18, a control module 20, an actuator 22, and a valve system 24.

The gear system 12 typically provides an output to a traction device (not shown) on an associated machine. The machine may be, for example, an earth-working machine, and the traction device may include tracks, wheels, belts, or other ground-engaging apparatus. The gear system 12 is a hydromechanical system of any suitable type, including for example, an input coupled configuration. Other configurations, such as output and series coupled configurations, are also suitable for application of the disclosed principles.

The hydromechanical transmission 10 connects to an engine 14, which may be any device producing a rotational output. Exemplary engine types include internal combustion engines, whether gas or diesel, electric motors, hydraulic motors, and so on. The engine 14 provides rotational energy to the hydrostatic unit 16, e.g., to pressurize an oil or fluid, as well as to the gear system 12.

The hydrostatic unit 16 comprises at least two rotating groups. The rotating groups as shown include a variable displacement pump 26 and a fixed displacement motor 28, although the rotating groups may alternatively both be of a variable displacement configuration. The variable displacement pump 26 fluidly drives the fixed displacement motor 28 to output rotational energy to the gear system 12. The hydrostatic unit 16 may be axial piston, bent axis, or other suitable configuration. Similarly, the hydrostatic unit 16 may be arranged in a "U", inline, or other known arrangement.

The input module 18 receives commands, or instructions, from a command source and transmits the commands to the control module 20 to operate the machine according to the received commands. The command source for the input module 18 may comprise a dial, keyboard, interactive display, buttons, switches and/or pedals, and the input module may operate according to computer-executable instructions read from a computer-readable medium such as a memory device. The received commands may be data identifying a desired input, predetermined criteria, a particular condition, or established parameters entered into the input module 18. The commands may be preprogrammed into the control module 20 to perform according to predetermined criteria and/or parameters, under predetermined conditions. The command source may be activated by an operator, such as a human being, or may be activated by the execution or operation of software or circuitry configured to perform a particular function.

The control module 20 communicates with the input module 18, first and second speed sensors 30 and 32, and the valve system 24. The control module 20 receives a command input from the input module 18 and determines that a certain motor torque output is desired to provide the desired machine response. The illustrated system is not exclusive of other components, and for example, other sensors may additionally or alternatively be used as desired to provide additional feedback or system information.

It is noted that a module, such as the input module 18 and the control module 20, may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The control module 20 controls the actuator 22, which influences the displacement of the variable displacement pump 26. The actuator 22 comprises a piston 34 centrally located in a cylinder 36. A pressure differential between a first side 38 and a second side 40 of the cylinder 36 effectuates a desired displacement of the variable displacement pump 26 via a swash plate mechanism, as will be appreciated by those of skill in the art. The actuator 22 includes one or more actuator springs 42 and 44 configured to produce a centering force proportional to position, preferably without discontinuity, throughout the entire range of movement of the actuator piston 34. While the springs require additional force to overcome, they provide stability in that the inertia of the pump pistons would otherwise tend to push the pump away from zero displacement.

The illustrated valve system 24 adjusts the pressure acting on the actuator 22 according to signals from the control module 20. The valve system 24 includes first and second pressure controlling valves 47 and 48. The first pressure-controlling valve 47 communicably connects to the control module 20 and the first side 38 of the actuator 22, and the second pressure-controlling valve 48 communicably connects to the control module 20 and the second side 40 of the actuator 22. The first and second pressure controlling valves 47 and 48 supply known pressures as a function of command input from control module 20. It will be appreciated that other valving arrangements may be used to suit a particular implementation.

Pressure sensors 50 are optionally included in the actuation system and operate in conjunction with the first and second pressure controlling valves 47 and 48 to monitor actual pressures applied to the actuator 22. The sensors 50 communicate with the control module 20 to provide information used to control torque according to the described principles as will be discussed in greater detail further below, as well as to control valve flow losses, valve-to-valve variations, and to account for valve nonlinearities. Pressure sensors 52 are optionally included in the hydrostatic unit 16 to provide more accurate control of motor torque. The additional sensor arrangements may also improve diagnostic and error detection functions.

As noted above, the described principles allow torque control via actuator pressure control, which is superior in many environments to traditional control schemes, e.g., speed control via pump displacement control. Parameters that are considered in establishing the torque control system in the described context include the spring rate of the actuator springs as well as the preload under which such springs are installed. Another factor that affects the operation of the torque control system is the pump port plate angle within the pump of the hydraulic unit 16, as will be seen in the discussion of the actuator pressure control map.

Figure 2:
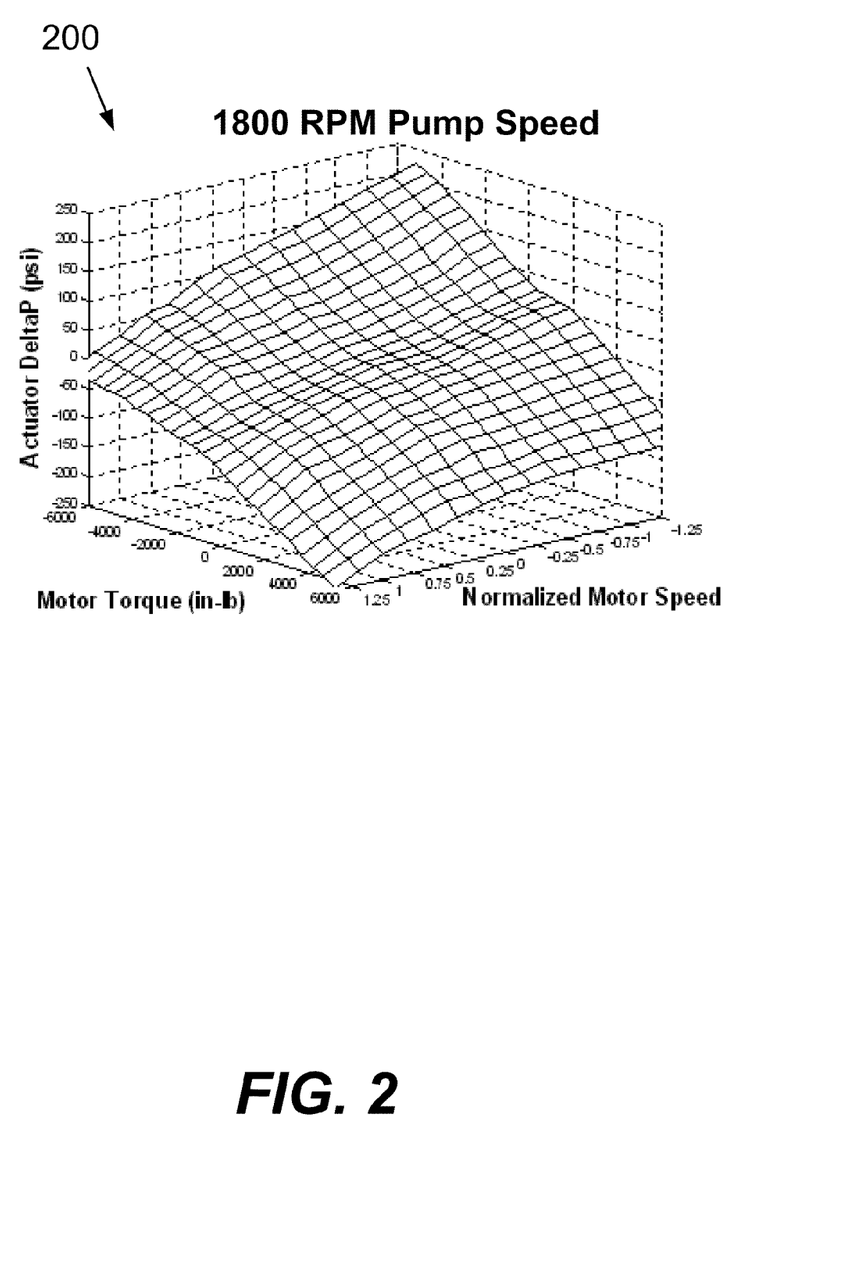
FIG. 2 is an actuator pressure mapping usable in an embodiment of the described principles to determine an actuator pressure that when applied will cause a variator or other hydraulic motor to output a desired torque.

FIG. 2 illustrates a map 200 for setting the actuator pressure (or pressure differential) to attain a determined desired torque. It has been appreciated by the inventors hereto that the torque experienced/imposed by the motor of the hydraulic unit 16 is fed back through the pump of the hydraulic unit 16, and thus to the actuator itself. This feedback mechanism may also be referred to as a "swivel force." By establishing a certain actuator pressure, the system establishes a corresponding motor torque. As the load on the motor changes, the force fed back to the actuator changes, thus allowing the actuator position to change as well. However, the actuator pressure is maintained as a constant thus fixing the output torque at a corresponding constant. In this way, there is no need to explicitly control output speed and manage the fed back torque to control lugging or surging, since the feedback on the pressure-controlled actuator allows movement of the actuator and thus holds the output torque at the desired torque regardless of speed.

The illustrated map 200 shows applied actuator pressure differential for a pump speed of 1,800 revolutions per minute to cause the variable displacement pump 26 to output a desired torque at an existing motor speed ratio (motor speed divided by pump speed). As with all maps generated pursuant to the described principles, the map 200 is substantially devoid of discontinuities or flat spots, i.e., is substantially monotonic, in each dimension. The control module 20 manages the actuator pressure via the valve system 24. The map 200 relates actuator force and normalized motor speed ratio to desired motor output torque. This relationship can also be mapped to desired circuit pressure. Circuit pressure also relates to motor torque through the motor's fixed hydraulic displacement. Circuit pressure can also relate to motor torque with a variable displacement motor when the motor displacement is specifically commanded or known via measurement. Motor torque is a function of output torque through mechanical reductions in the gear system 12. Variable displacement pump speed is known from the first speed sensor 30. Variable displacement pump displacement angle is generally proportional to normalized motor speed ratio, which is the ratio of the fixed displacement motor speed to the variable displacement pump speed. Normalized motor speed ratio is calculated within the control module 20 with input from the first and second speed sensors 30 and 32.

The control module 20 refers to the map 200 to determine the actuator pressure to be applied to the actuator 22. Upon determination of the proper actuator pressure, the valve system 24 effectuates the proper pressure. It is noted that for different pump speeds a different mapping surface is used. It is further noted that for systems with multiple pumps, each pump may require its own map. To effectuate the desired machine response and to output the desired torque, the control module 20 receives input information from the command source and input module 18. The command source enters the predetermined criteria, parameters, or conditions into the input module 18. The control module 20 processes the input information to determine the desired torque for the given input, determines pump speed, determines normalized motor speed ratio, and refers to the map 200 (or other map) to determine how much actuator force is necessary to effectuate the desired displacement of the variable displacement pump 26. In response to a signal indicative of the required actuator force, the first and second pressure controlling valves 47 and 48 cooperate to provide the specified pressure (differential) to the actuator. The motor 28 then outputs the desired torque.

Figure 3:
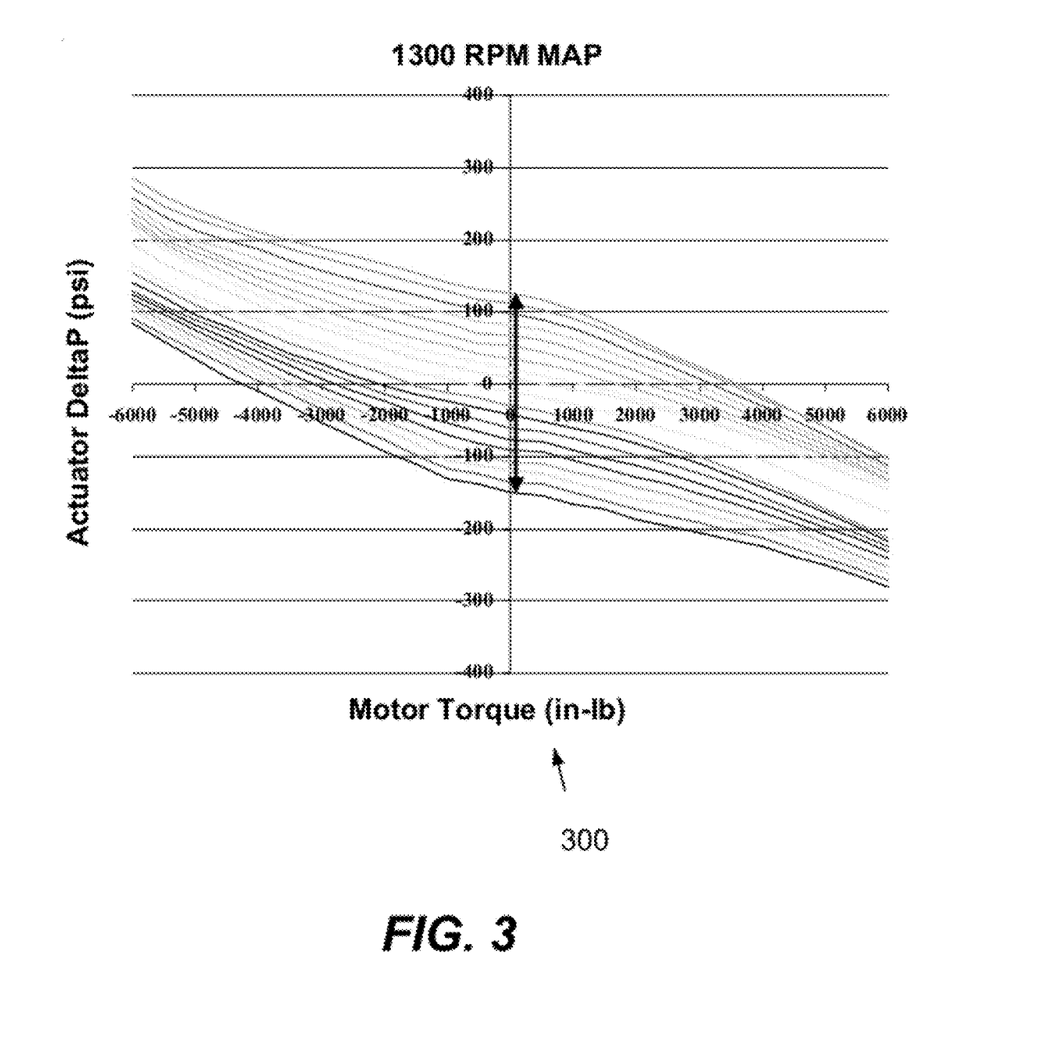
FIG. 3 is a mapping of actuator pressure versus motor output torque and motor speed ratio for a particular pump speed.

Thus, it will be appreciated that properly configuring the system and accurately establishing the resultant torque-pressure map 200 are aid the proper functioning of this scheme. As noted above, the pump of the hydraulic unit 16 includes one or more pump port plates, and the port plate indexing or timing sets the slope of actuator pressure versus circuit pressure (motor torque) as can be seen in FIG. 3. In particular, FIG. 3 shows a plot of actuator pressure (delta pressure in PSI) on the abscissa with respect to motor torque (in-lbs) on the ordinate for a given pump speed (1300 RPM in the illustrated example). The normalized motor speed ratio axis is perpendicular to the shown axes, and the numerous plots represent various motor speed ratio in both directions.

It is desirable to maximize motor torque controllability at low pump speeds to yield high system stability. To that end, a high actuator pressure slope in any direction indicates a higher resolution and thus better controllability. However, there are limits to the slope that may be achieved. As can be seen, both actuator spring rate/preload and port plate timing affect the relationship between actuator pressure and motor torque. With respect to the port plate timing, increased port plate timing increases the slope of the relationship.

An increase in port plate timing would allow finer control of torque via actuator pressure. However, the hydraulic supply system has a finite supply pressure, and the spring rate and port plate timing cannot be set so that the maximum possible torque is rendered unavailable due to limited actuator control force. Moreover, excessively high port plate timing tends to increase pump noise to an uncomfortable level for the machine user. In an embodiment, the actuator springs are high rate, and are sized to provide zero preload. In a particular embodiment, the spring package employs captured coaxial springs to reach the desired rate.

In these embodiments, when there is no applied actuator pressure (or pressure differential), the pump actuator return to zero displacement, but the spring rates are not so high as to reduce the maximum available torque. Within these constraints, the slope of actuator pressure versus motor speed ratio is maximized to enhance open loop motor speed controllability at high pump speeds. No spring or port plate timing should be selected to cause discontinuity which could cause control instability.

Figure 4:
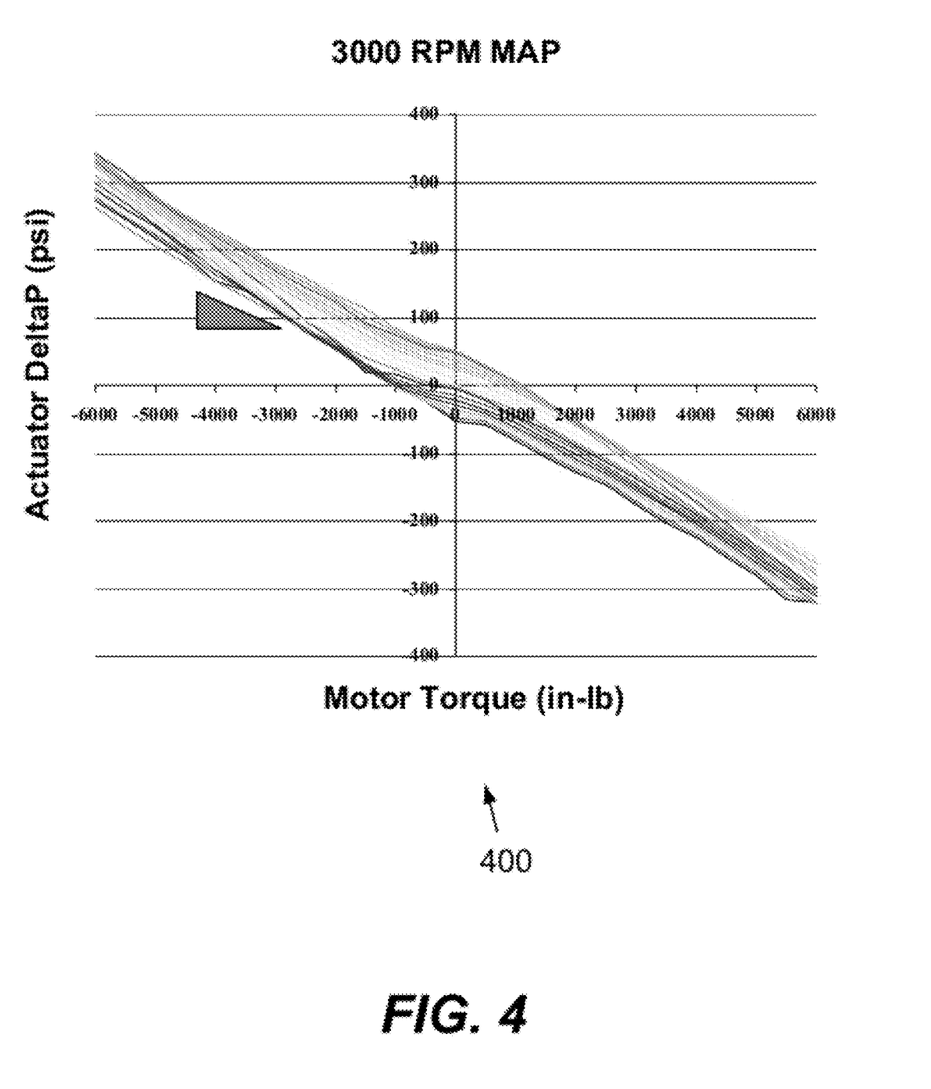
FIG. 4 is a mapping of actuator pressure versus motor output torque and motor speed ratio for another pump speed.

FIG. 4 is similar to FIG. 3, but illustrates a set of pressure/motor torque curves for a different pump speed, i.e., 3000 RPM. From reviewing both FIG. 3 and FIG. 4, it will be appreciated that the actuator pressure slope with respect to motor speed ratio (the spacing between the lines) is higher at low pump speeds than at high pump speeds, thus having increased control resolution. Further, as noted above, although not apparent from the plots, actuator pressure slope with respect to motor speed ratio can also be increased by increasing the actuator spring rate within the noted limits.

Finally, as can be seen from the illustrated plots of FIGS. 3 and 4, the actuator pressure slope with respect to motor torque is lower at low pump speeds than at high pump speeds, which is preferably considered so that the spring rate is not chosen in a way that limits the available torque.

From the foregoing, it can be seen that motor speed ratio control slope can be maximized by increasing the spring rate, while the motor torque control slope can be maximized by increasing the port plate timing of the port plate. In configuring the hydraulic unit 16, these optimizations are executed while ensuring that the charge pressure has not been exceeded for any variator operating condition, and that the pump noise and instantaneous pressures at the port plate remain within predetermined limits to reduce pump noise and increase pump longevity.

Although theoretical pressure/torque maps may be usable, it is desirable in an embodiment to create the pressure torque maps empirically using the properly configured hydraulic unit 16 so that the resultant data includes transmission losses such as leakage, as well as transmission gear losses, as well as actuator friction, hysteresis, and variator damping. Although any such map will depend upon the exact system size, type, configuration, etc., the plot illustrated in FIG. 2 is exemplary of an appropriate empirical mapping.

The torque control enabled by this mapping (and similar derived mappings for alternative pump speeds) provides smoother shifts and better overall smoothness of the system. This type of control also provides a more intuitive stopping experience compared to traditional speed control systems.

As resistance to machine movement increases, for example, as the machine pushes against a pile of dirt or rock, or as the machine climbs a hill, the speed of the motor changes. Consequently, the normalized motor speed ratio changes. The control module 20 recognizes the change, refers to the appropriate map and determines a new actuator pressure necessary for maintaining the desired torque. Subsequently, the control module 20 sends a signal to the pressure controlling valves 47 and 48 to adjust the pressures within the actuator according to the determined actuator differential pressure. The pressure controlling valves provide the determined pressure (pressure differential) to the actuator 22.

Industrial Applicability

The described principles are applicable to machines and devices wherein a hydraulic system with a variable displacement pump is used, and wherein smoothness of operation and rapid response to environmental changes are important. In this context, the disclosed system facilitates motor torque control via actuator pressure control.

Figure 5:
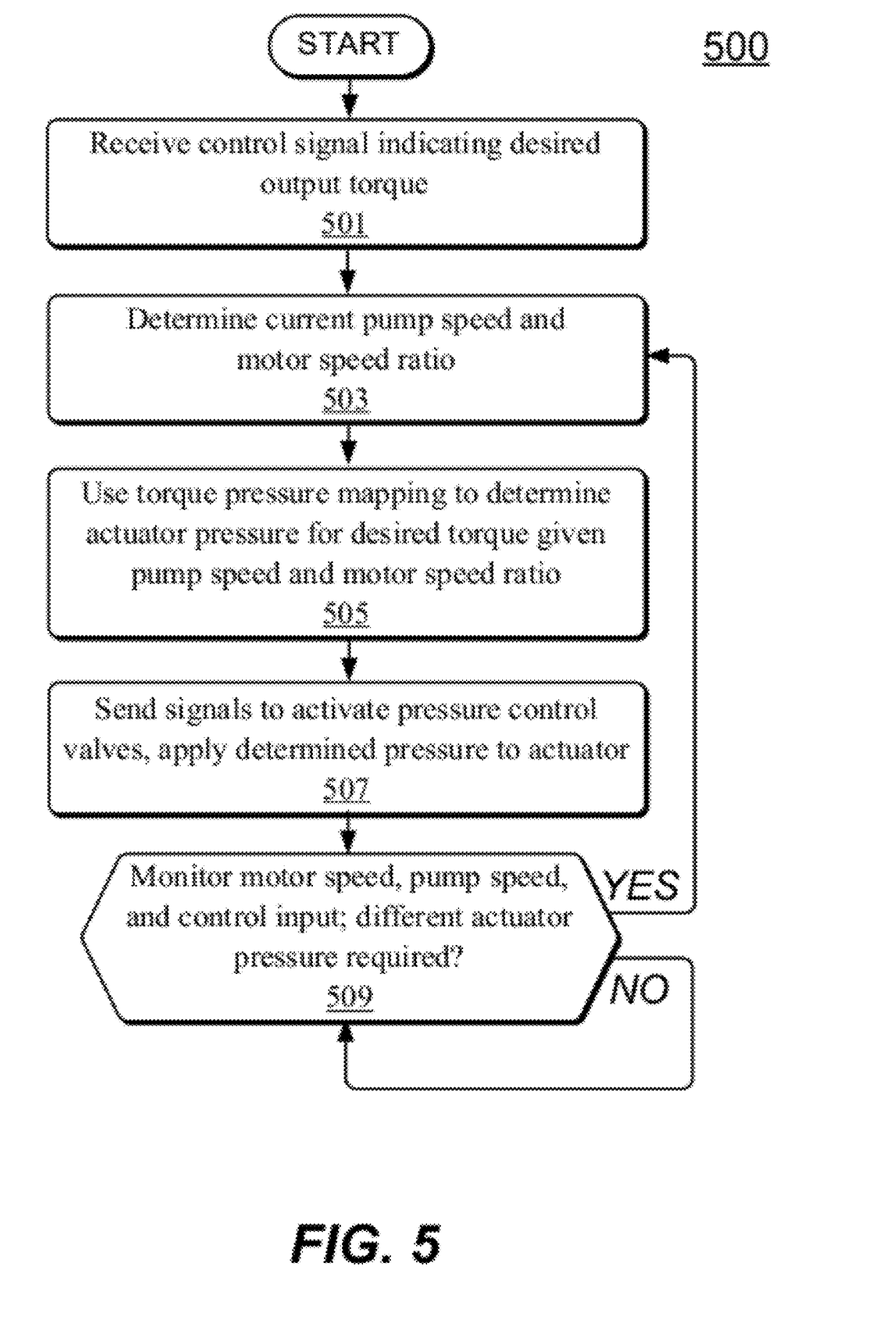
FIG. 5 is a flow chart illustrating a process of employing a mapping such as that of FIG. 2 to yield a desired output torque.

FIG. 5 is a flow chart showing a process 500 for transmission control with respect to a hydromechanical transmission having a variator as shown, or similar to that shown, in FIG. 1. The process 500 begins at stage 501 with the receipt of a control signal indicating a desired output torque. The system then determines the pump speed and motor speed ratio (or normalized motor speed ratio) at stage 503. At stage 505, the process uses the torque pressure mapping to determine the required actuator pressure to produce the desired torque given the motor speed ratio and pump speed. This process may use standard map interpolation and extrapolation techniques. Finally at stage 507, the system sends signals, e.g., current signals, to activate one or more pressure control valves to cause the determined pressure or pressure differential to be applied to the actuator, thus causing the motor to output the desired torque. The motor speed ratio, pump speed, and control input (for signaling desired torque) may be monitored as shown at stage 509 to determine whether a change in conditions requires a different actuator pressure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

List of Elements

TITLE: VARIATOR PRESSURE-SET TORQUE CONTROL
FILE: CAT 10-0054
HYDROMECHANICAL TRANSMISSION 10
GEAR SYSTEM 12
ENGINE 14
HYDROSTATIC UNIT 16
INPUT MODULE 18
CONTROL MODULE 20
ACTUATOR 22
A VALVE SYSTEM 24
VARIABLE DISPLACEMENT PUMP 26
FIXED DISPLACEMENT MOTOR 28
FIRST SPEED SENSOR 30
SECOND SPEED SENSOR 32
PISTON 34
CYLINDER 36
PISTON FIRST SIDE 38
PISTON SECOND SIDE 40
ACTUATOR SPRING 44
ACTUATOR SPRING 42
FIRST PRESSURE CONTROLLING VALVE 47
SECOND PRESSURE CONTROLLING VALVE 48
PRESSURE SENSOR 50
PRESSURE SENSOR 52
MAP 200
FIRST PLOT OF ACTUATOR PRESSURE 300
SECOND PLOT OF ACTUATOR PRESSURE 400
FLOW CHART OF PROCESS FOR TRANSMISSION CONTROL 500
FIRST PROCESS STAGE 501
SECOND PROCESS STAGE 503
THIRD PROCESS STAGE 505
FOURTH PROCESS STAGE 507
FIFTH PROCESS STAGE 509

We claim:

1. A method of configuring a transmission having an engine input for receiving power from a primary power source and a motor input linked to a hydraulic variator comprising a hydraulic pump and a hydraulic motor driven by the hydraulic pump, the variator further including a pressure-driven actuator for controlling a displacement of the hydraulic pump, the method comprising:

establishing a torque-pressure curve of the transmission, wherein the torque-pressure curve relates motor output torque to motor speed, actuator pressure, and pump speed to maximize output torque resolution of the variator with respect to actuator pressure changes while maintaining the curve substantially monotonic in each dimension at any available motor speed, without exceeding a predetermined motor speed limit and without exceeding available actuator pressure limits; and configuring the transmission to output a torque by determining an actuator pressure to be applied based on the established torque-pressure curve, the desired torque, a current motor speed, and a current pump speed.

2. The method of configuring a transmission according to claim 1, wherein the motor speed is a normalized motor speed.

3. The method of configuring a transmission according to claim 1, wherein the transmission is a hystat transmission.

4. The method of configuring a transmission according to claim 1, wherein the transmission is a hydromechanical transmission.

5. The method of configuring a transmission according to claim 1, wherein the transmission further includes one or more pressure control valves to apply pressure to control the actuator, the method further comprising:

generating and transmitting to the one or more pressure control valves one or more signals to activate the one or more pressure control valves to cause the determined actuator pressure to be applied to the actuator.

6. The method of configuring a transmission according to claim 5, wherein the determined actuator pressure is a pressure differential.

7. The method of configuring a transmission according to claim 5, further comprising monitoring the pump speed and motor speed after the step of generating to determine whether to alter the determined actuator pressure.

8. An improved hydraulic transmission comprising:

a primary input for receiving power from a primary power source;

a motor input linked to a hydraulic variator comprising a hydraulic pump and a hydraulic motor driven by the hydraulic pump, the variator further including a pressure-driven actuator for controlling a displacement of the hydraulic pump; and a controller for receiving an indication of desired torque and for controlling the transmission to supply the desired torque by applying a predetermined mapping to identify an actuator pressure to apply to create the desired output torque, wherein the predetermined mapping relates motor output torque to motor speed, actuator pressure, and pump speed, and wherein the resolution of output torque as a function of actuator pressure is substantially maximized while maintaining the map substantially monotonic in each dimension without exceeding a predetermined motor speed limit and without exceeding available actuator pressure limits.

9. The improved hydraulic transmission according to claim 8, wherein the motor speed is a normalized motor speed.

10. The improved hydraulic transmission according to claim 8, wherein the transmission is a hystat transmission.

11. The improved hydraulic transmission according to claim 8, wherein the transmission is a hydromechanical transmission.

12. The improved hydraulic transmission according to claim 8, wherein the transmission further includes one or more pressure control valves to apply pressure to control the actuator, and wherein the controller is further adapted to generate and transmit to the one or more pressure control valves one or more signals to activate the one or more pressure control valves to cause the determined actuator pressure to be applied to the actuator.

13. The improved hydraulic transmission according to claim 12, wherein the determined actuator pressure is a pressure differential.

14. The improved hydraulic transmission according to claim 12, wherein the controller is further adapted to monitor the pump speed and motor speed, after transmitting the one or more signals to activate the one or more pressure control valves, to determine whether to alter the determined actuator pressure.

15. A method of generating a torque-pressure curve for a hydraulic transmission including a hydraulic pump and a hydraulic motor driven by the hydraulic pump via a pump port plate having a port plate angle, the variator further including a pressure-driven actuator for controlling a displacement of the hydraulic pump, the actuator having one or more springs biased to center the actuator, the method comprising:

selecting a port plate angle for the pump port plate and selecting one or more respective spring rates for the one or more actuator springs so as to maximize output torque resolution of the hydraulic motor with respect to actuator pressure changes while allowing the motor to reach maximum available torque without the transmission exceeding a predetermined motor speed limit and actuator pressure limits; and applying a plurality of actuator pressures at a plurality of motor speeds and pump speeds to generate a respective plurality of motor torques, and recording the respective plurality of motor torques in association with the applied actuator pressures, motor speeds and pump speeds to create a torque-pressure curve for the transmission.

16. The method of generating a torque-pressure curve according to claim 15, wherein the motor speed is a normalized motor speed.

17. The method of generating a torque-pressure curve according to claim 15, wherein the transmission is a hystat transmission.

18. The method of generating a torque-pressure curve according to claim 15, wherein the transmission is a hydromechanical transmission.

19. The method of generating a torque-pressure curve according to claim 15, wherein the actuator pressures are pressure differentials.

20. The method of generating a torque-pressure curve according to claim 15, further comprising reducing the port plate angle after selecting a port plate angle and after selecting the one or more spring rates, but prior to applying a plurality of actuator pressures at a plurality of motor speeds and pump speeds, wherein the reduction in port plate angle is selected so as to reduce pump noise by a predetermined amount.

* * * * *